United States Patent
Tsukagoshi

(10) Patent No.: US 8,878,478 B2
(45) Date of Patent: Nov. 4, 2014

(54) PROJECTOR AND METHOD OF CONTROLLING THE SAME

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 826 days.

(21) Appl. No.: 13/078,337

(22) Filed: Apr. 1, 2011

(65) Prior Publication Data

US 2011/0241593 A1    Oct. 6, 2011

(30) Foreign Application Priority Data

Apr. 2, 2010  (JP) .................................. 2010-085863

(51) Int. Cl.
*G05B 19/29*    (2006.01)
*G03B 21/14*    (2006.01)
*G02B 7/10*    (2006.01)

(52) U.S. Cl.
CPC ............... *G03B 21/14* (2013.01); *G02B 7/102* (2013.01)
USPC ............ 318/601; 318/560; 318/615; 318/632

(58) Field of Classification Search
USPC ......... 318/560, 601, 602, 603, 615, 616, 621, 318/632, 652
See application file for complete search history.

(56) References Cited

U.S. PATENT DOCUMENTS

| | | | | |
|---|---|---|---|---|
| 4,533,991 A * | 8/1985 | Georgis | ........................ | 700/44 |
| 5,089,758 A * | 2/1992 | Sogawa | ........................ | 318/603 |
| 5,313,147 A * | 5/1994 | Yoneda et al. | ................ | 318/569 |
| 5,936,792 A | 8/1999 | Kobayashi et al. | | |
| 6,107,771 A * | 8/2000 | Maeda | ......................... | 318/630 |
| 6,118,945 A * | 9/2000 | Tanaka | ............................ | 396/79 |
| 8,059,956 B2 * | 11/2011 | Kim et al. | ..................... | 396/127 |

FOREIGN PATENT DOCUMENTS

| | | |
|---|---|---|
| JP | 06-102905 A | 4/1994 |
| JP | 06-202709 A | 7/1994 |
| JP | 09-035430 A | 2/1997 |
| JP | 2001-100801 A | 4/2001 |
| JP | 2006-313979 A | 11/2006 |

* cited by examiner

*Primary Examiner* — Bentsu Ro
*Assistant Examiner* — Thai Dinh
(74) *Attorney, Agent, or Firm* — ALG Intellectual Property, LLC

(57) ABSTRACT

A projector includes: a drive motor adapted to drive a lens unit; a control section adapted to control the drive motor; a storage section adapted to store a target position of the lens unit; and a position detector adapted to detect a present position of the lens unit, wherein if a deviation between the target position stored in the storage section and the present position detected by the position detector is equal to or larger than a predetermined value, the control section performs drive of the drive motor with feedforward control until the present position and the target position are coincident with each other, and performs drive control of the drive motor with a predetermined unit based on a deviation between a stop position by the feedforward control and the target position.

8 Claims, 2 Drawing Sheets

PROJECTOR AND METHOD OF CONTROLLING THE SAME

CROSS-REFERENCE

The present application claims priority from Japanese Patent Application No. 2010-085863 filed on Apr. 2, 2010, which is hereby incorporated by reference in its entirety.

BACKGROUND

In the past, projectors have been configured so that the focus movement, the zoom movement, and the shift movement of a lens unit can be achieved by controlling drive motors, and in such a case, the function capable of adjusting the lens positions of the lens unit by controlling the respective drive motors has been provided.

As a device of controlling the drive motor described above, in the past, for example, there has been disclosed a technology of providing a feedback processing section for measuring the position of the actuator and feeding back the shift from the target position to the drive section to thereby make the drive section correct the shift, and a feedforward processing section for previously calculating the drive force to be input based on the target position of the actuator, then calculating the pattern of the drive force to be applied using the drive force thus calculated and a feedforward arithmetic expression set previously, and then transmitting the pattern of the drive force to the drive section, thereby making it possible to arbitrarily set the feedforward arithmetic expression in accordance with the distance from and the direction of the given target position using the feedforward processing section (see, e.g., Japanese Patent Publication No. 2001-100801).

Further, as another technology, there has been disclosed a technology of providing a control parameter correction section for a feedforward control device and a control parameter correction section for a feedback control device, and performing the latter correction using knowledge processing, thereby accurately optimizing the control parameters of the feedforward/feedback control devices (see, e.g., Japanese Patent Publication No. 6-102905). Further, as another technology, there has been disclosed a technology of determining whether the timing of the output of the feedforward control system and the output of the feedback control system are alternately by switching, or used together based on the fuzzy inference section (see, e.g., Japanese Patent Publication No. 6-202709).

However, since in the technologies described in the respective documents, the feedback control and the feedforward control are used together, the control requires a huge amount of calculation, and the cost of the processor or the like increases. Further, the feedback control can perform accurate position control, but has a problem that it takes time until reaching the target position. Therefore, if it is arranged that the position control is performed by the feedforward control, it is possible to control the time required for reaching the target position to be shorter, but there arises the problem of inferior accuracy of the position control.

SUMMARY

Various embodiments may provide a projector and a control method therefor capable of performing prompt and accurate position control.

According to at least one embodiment of the disclosure, there is provided a projector which includes: a drive motor adapted to drive a lens unit, a control section adapted to control the drive motor, a storage section adapted to store a target position of the lens unit, and a position detector adapted to detect a present position of the lens unit, wherein if a deviation between the present position detected by the position detector and the target position stored in the storage section is equal to or larger than a predetermined value, the control section performs drive of the drive motor with feedforward control until the present position detected and the target position are coincident with each other, and performs drive control of the drive motor with a predetermined unit based on a deviation between a stop position by the feedforward control and the target position.

According to this aspect of the embodiment, the control section moves the lens of the lens unit using the feedforward control, and if the stop position and the target position are shifted from each other, the control section performs the drive control of the drive motor with a predetermined unit based on the deviation between the stop position and the target position. Therefore, the lens position can be controlled promptly compared to the case of performing the control using the feedback control and the feedforward control in combination as in the related art.

Further, in the projector according to the above aspect of the embodiment, the control section performs the drive control with a predetermined unit by the drive motor by the number of times of movement with the predetermined unit obtained based on the following formula:

$$N = \text{INT}(X/W + 0.5)$$

(where, N denotes the number of times of movement by the predetermined unit, X denotes the deviation, and W denotes the predetermined unit).

According to this aspect of the embodiment, since it is arranged that the number of times of movement with the predetermined unit is calculated using the arithmetic expression, and the drive control of the drive motor is performed based on the calculation result, if the stop position of the lens unit and the target position are shifted from each other, the lens can easily and promptly be moved to the accurate position.

Further, in the projector according to the above aspect of the embodiment, the control section performs the drive control with a predetermined unit by the drive motor in a direction in which the deviation between the stop position and the target position is reduced until the deviation becomes equal to or smaller than a half of the predetermined unit or until a sign of the deviation is inverted.

According to this aspect of the embodiment, since it is arranged that the drive control with a predetermined unit by the drive motor is performed in the direction in which the deviation between the stop position and the target position is reduced until the deviation becomes equal to or smaller than a half of the predetermined unit or until a sign of the deviation is inverted, if the stop position of the lens unit and the target position are shifted from each other, the lens can easily and promptly be moved to the accurate position by the predetermined unit.

Further, in the projector according to the above aspect of the embodiment, the drive motor performs shift drive of the lens unit.

According to this aspect of the embodiment, since it is arranged that the shift drive of the lens unit is performed by the drive motor, if the shift drive of the lens unit is performed, the lens position can promptly be controlled.

According to at least one embodiment of the disclosure, there is provided a method of controlling a projector which includes: the steps of (a) performing, by a control section, drive of a drive motor adapted to drive a lens unit with feedforward control until a present position of the lens unit detected by a position detector and a target position of the lens unit stored in a storage section are coincident with each other if a deviation between the target position and the present position is equal to or larger than a predetermined value, and (b) performing drive control of the drive motor with a predetermined unit based on a deviation between a stop position by the feedforward control and the target position.

According to this aspect of the embodiment, the lens of the lens unit is moved using the feedforward control, and if the stop position and the target position are shifted from each other, the drive control of the drive motor is performed with a predetermined unit based on the deviation between the stop position and the target position. Therefore, the lens position can promptly be controlled compared to the case of performing the control using the feedback control and the feedforward control in combination as in the related art.

Further, in the method of controlling a projector according to the above aspect of the embodiment, the step (b) is performed by the number of times of movement with the predetermined unit obtained based on the following formula:

$$N = \text{INT}(X/W + 0.5)$$

(where, N denotes the number of times of movement by the predetermined unit, X denotes the deviation, and W denotes the predetermined unit).

According to this aspect of the embodiment, since it is arranged that the number of times of movement with the predetermined unit is calculated using the arithmetic expression, and the drive control of the drive motor is performed based on the calculation result, if the stop position of the lens unit and the target position are shifted from each other, the lens can easily and promptly be moved to the accurate position.

Further, in the method of controlling a projector according to the above aspect of the embodiment, the step (b) is performed in a direction in which the deviation between the stop position and the target position is reduced until the deviation becomes equal to or smaller than a half of the predetermined unit or until a sign of the deviation is inverted.

According to this aspect of the embodiment, since it is arranged that the drive control with a predetermined unit by the drive motor is performed in the direction in which the deviation between the stop position and the target position is reduced until the deviation becomes equal to or smaller than a half of the predetermined unit or until a sign of the deviation is inverted, if the stop position of the lens unit and the target position are shifted from each other, the lens can easily and promptly be moved to the accurate position by the predetermined unit.

Further, in the method of controlling a projector according to the above aspect of the embodiment, the drive motor performs shift drive of the lens unit.

According to this aspect of the embodiment, since it is arranged that the shift drive of the lens unit is performed by the drive motor, if the shift drive of the lens unit is performed, the lens position can promptly be controlled.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF AN EXEMPLARY EMBODIMENT

An embodiment of the invention will hereinafter be explained with reference to the accompanying drawings.

Figure 1:
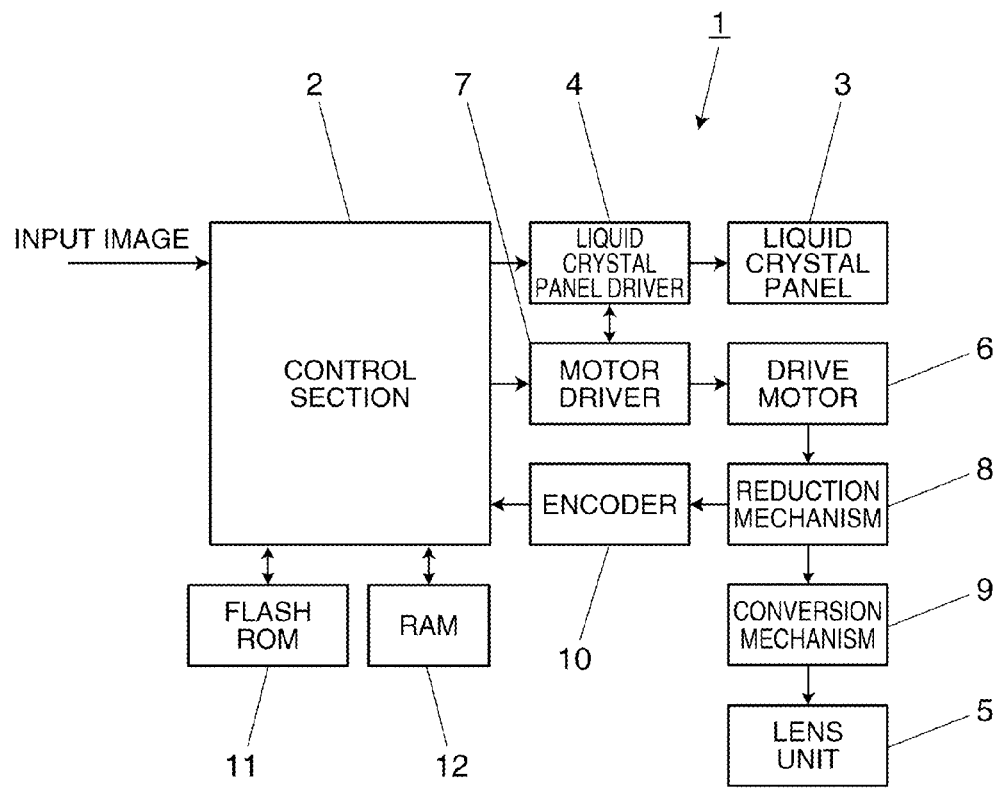
FIG. 1 is a schematic configuration diagram showing a projector according to an embodiment of the invention.

FIG. 1 is a schematic configuration diagram showing a projector according to an embodiment of the invention. In the present embodiment, a projector 1 is provided with a control section 2 to which image information transmitted from, for example, a personal computer, a DVD player, or a blu-ray disc player is input. The control section 2 is configured to perform a predetermined image processing such as a zoom process, a sharpness adjustment process, or a keystone correction process based on the image information input therein, and at the same time, perform various kinds of control in an integrated manner.

Further, a panel driver 4 for operating a liquid crystal panel 3 based on the image information is connected to the control section 2, and it is arranged that the liquid crystal panel 3 provided with a predetermined image is illuminated by an illumination device, and at the same time, the light transmitted through the liquid crystal panel 3 is emitted on a screen (not shown) through a lens unit 5 incorporating a projection optical system therein, thereby making it possible to project a desired image.

Further, a drive motor 6 is incorporated in the lens unit 5, and a motor driver 7 for performing the drive control of the drive motor 6 is connected to the control section 2. A reduction mechanism 8 for transmitting the drive force of the drive motor 6 with reduced speed is coupled to the drive motor 6, and a conversion mechanism 9 for converting the rotational movement transmitted from the drive motor 6 via the reduction mechanism 8 into linear movement to thereby drive the lens of the lens unit 5 is coupled to the reduction mechanism 8. The lens unit 5 incorporates a zoom mechanism for performing a zoom operation of the lens, a focus mechanism for performing a focus operation of the lens, an X-shift mechanism for shifting the lens in the X direction, and a Y-shift mechanism for shifting the lens in the Y direction perpendicular to the X direction, and it is arranged that the drive motor 6, the reduction mechanism 8, and the conversion mechanism 9 are provided to each of the mechanisms. Further, an encoder 10 as a position detector for detecting the position of the lens in accordance with the position information of the reduction mechanism 8 is connected to the control section 2.

Further, a flash ROM 11 as a storage section for storing the program and predetermined information for operating the projector 1, and a RAM 12 for temporarily storing predetermined information are each connected to the control section 2. Further, in the present embodiment, the control section 2 is configured so as to be able to previously store the zoom position, the focus position, the X-shift position, and the Y-shift position of the lens of the lens unit 5 in the flash ROM 11 as the respective target positions of the lens.

Further, the control section 2 is configured so as to compare the target position of the lens unit 5 stored in the flash ROM 11 and the present position of the lens unit 5 with each other when driving the drive motor 6, not to perform the drive control of the drive motor 6 if the deviation of the positions is small, but to perform the feedforward control if the deviation of the positions is equal to or larger than a predetermined value. Further, when performing the feedforward control of the drive motor 6, the control section 2 is configured so as to obtain the present position of the lens by the encoder 10, then compare the present position and the target position with each other, and control the drive motor 6 to stop if the present position and the target position are the same or if the present position exceeds the target position. Further, the control section 2 compares the stop position by the feedforward control and the target position with each other, and then calculates the difference between the stop position and the target position as a deviation. The control section 2 is configured so as not to correct the stopping position if the deviation is smaller than a half of the smallest controllable moving distance, but to calculate the moving distance with the following formula if it is larger than a half of the smallest controllable moving distance.

$$N = \text{INT}(X/W + 0.5)$$

Here, N denotes the number of times of movement by the smallest moving distance, X denotes the deviation, and W denotes the smallest controllable moving distance. It should be noted that the reason that "+0.5" is introduced in the formula is for rounding off the calculation result, and the fractional part of the value obtained by performing "+0.5" is truncated to thereby be converted (INT) to an integer value.

Further, the smallest controllable value denotes the distance the lens position can travel per operation when, for example, the lens position is adjusted manually by operating a remote controller or a operation key. It should be noted that it is also possible to set the smallest controllable moving distance to, for example, a half of the amount the lens position can be moved by the manual operation. Further, the control of the drive motor 6 by the control section 2 as described above is commonly applied to all of the zoom drive, the focus drive, the X-shift drive, and the Y-shift drive.

Figure 2:
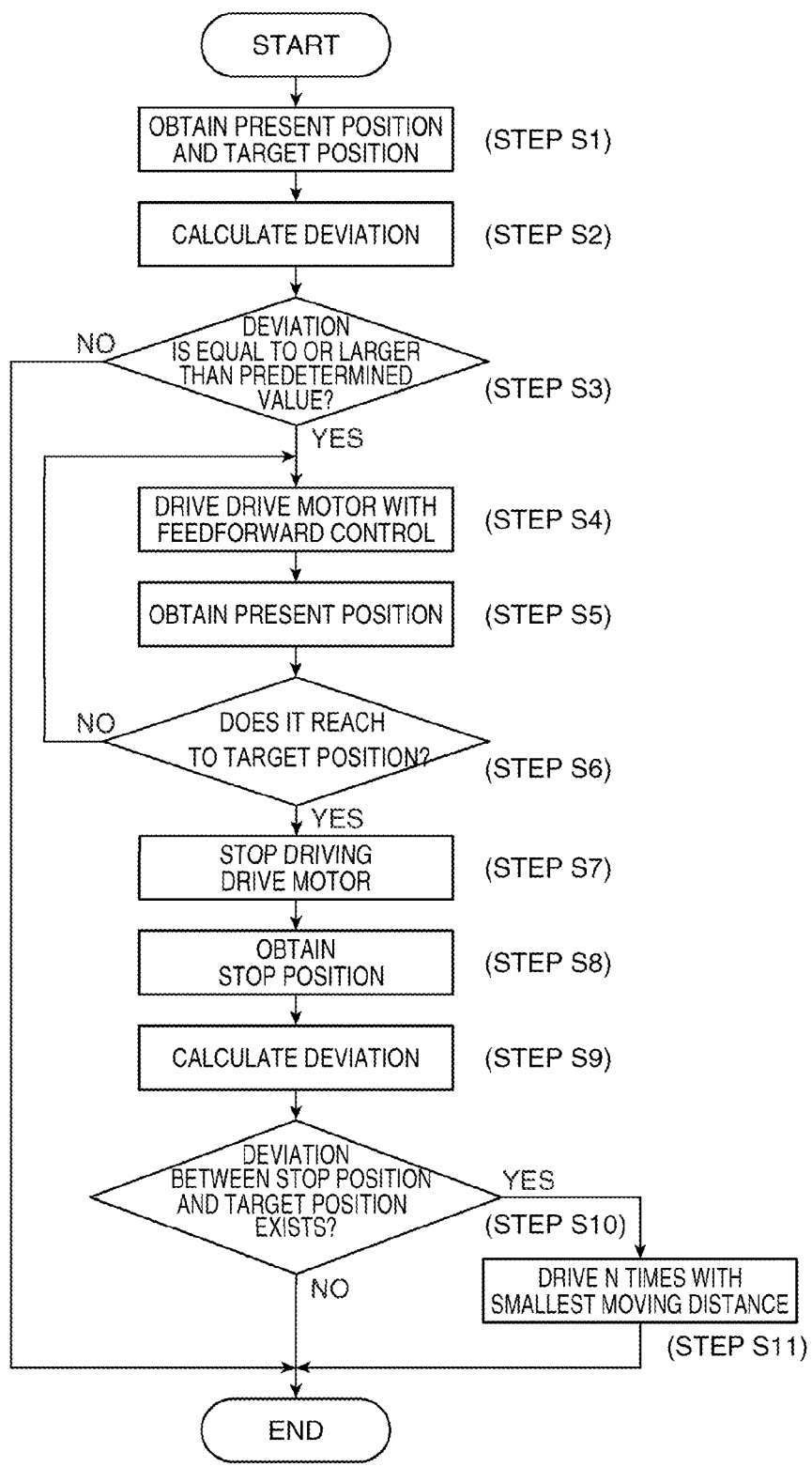
FIG. 2 is a flowchart showing an operation of a control method of the projector according to the embodiment of the invention.

Now, a control method of the projector 1 described above will be explained with reference to the flowchart shown in FIG. 2.

Firstly, in the case of making the drive motor 6 operate the lens, the control section 2 obtains the target position of the lens unit 5 stored in the flash ROM 11 and the present position (step S1), and then compares the target position and the present position with each other to obtain a deviation (step S2). Then, if the deviation of the positions is smaller than a predetermined value, the drive control of the drive motor 6 is not performed (NO in step S3). On the other hand, if the deviation of the positions is equal to or larger than the predetermined value (YES in step S3), the drive control of the drive motor 6 is performed by the feedforward control (step S4).

Subsequently, the control section 2 obtains the present position of the lens by the encoder 10 when performing the feedforward control of the drive motor 6 (step S5), and then compares the present position and the target position with each other to determine whether or not the stop position is reached to the target position (step S6). If the present position of the lens and the target position are coincident with each other (YES in step S6), the control section 2 performs the control of stopping the drive of the drive motor 6 (step S7). Further, if the present position of the lens and the target position are not coincident with each other (NO in step S6), the process returns to the step S4, and the drive motor 6 is driven.

The control section 2 obtains a stop position by the feedforward control and the target position (step S8), and then compares the stop position and the target position with each other to calculate the difference between the stop position and the target position as a deviation (step S9). Further, if the deviation is smaller than a half of the smallest controllable moving distance (NO in step S10), the drive control of the lens is terminated without correcting the stopping position. Further, if the deviation is larger than a half of the smallest controllable moving distance (YES in step S10), the control section 2 calculates the moving distance using the formula described above, then truncates the fractional part of the calculation result, and then performs the operation control N times with a unit of the smallest controllable moving distance (step S11). The drive control of the lens is terminated with this operation.

As described above, in the present embodiment, the control section 2 moves the lens of the lens unit 5 using the feedforward control, and if the stop position and the target position are shifted from each other, the control section 2 performs the drive control of the drive motor 6 with a unit of the smallest controllable moving distance. Therefore, the lens position can be controlled easily and promptly compared to the case of performing the control using the feedback control and the feedforward control in combination as in the related art.

Although it is arranged in the embodiment described above to obtain the number of times of the movement with the smallest moving distance using the arithmetic expression to thereby control the drive motor 6, it should be noted that it is also possible to arrange that the control section 2 performs the drive control with a unit of the smallest moving distance by the drive motor 6 only in the direction in which the deviation between the stop position and the target position is reduced, and then performs this operation until the deviation becomes equal to or smaller than a half of the smallest moving distance, or the sign of the deviation indicating the polarity is inverted. By performing the control described above, the lens position can be controlled easily and promptly without using the arithmetic expression.

Further, the invention is not limited to the embodiment described above, but can variously be modified within the scope and the spirit of the invention. For example, although in the embodiment described above, the encoder 10 coupled to the reduction mechanism 8 is used when obtaining the position information of the lens, it is also possible to use a linear sensor coupled to the conversion mechanism 9 or the lens unit 5.

What is claimed is:
1. A projector, comprising:
a drive motor adapted to drive a lens unit;
a storage section adapted to store a target position of the lens unit;
a position detector adapted to detect a present position of the lens unit; and
a control section adapted to
control the drive motor,
determine if a deviation between the target position stored in the storage section and the present position detected by the position detector is equal to or larger than a predetermined value, and
if the deviation between the target position and the present position is determined to be equal to or larger than the predetermined value, perform drive of the drive motor with feedforward control until the present position and the target position are coincident with each other and perform drive control of the drive motor with a predetermined unit of movement of the drive motor based on a deviation between a stop position by the feedforward control and the target position,
wherein the control section performs the drive control with the predetermined unit of movement of the drive motor by the drive motor by the number of times of movement with the predetermined unit of movement of the drive motor obtained based on the following formula:

$$N = \text{INT}(X/W + 0.5)$$

(where N denotes the number of times of movement by the predetermined unit of movement of the drive motor, X denotes the deviation between the stop position by the feedforward control and the target position, and W denotes the predetermined unit of movement of the drive motor).

2. The projector according to claim 1, wherein
the predetermined unit of movement of the drive motor is a smallest moving distance by which the control section can control the drive motor.

3. The projector according to claim 1, wherein
the control section performs the drive control with the predetermined unit of movement of the drive motor by the drive motor in a direction in which the deviation between the stop position and the target position is reduced until the deviation between the stop position and the target position becomes equal to or smaller than a half of the predetermined unit of movement of the drive motor or until a sign of the deviation between the stop position and the target position is inverted.

4. The projector according to claim 1, wherein
the drive motor performs shift drive of the lens unit.

5. A method of controlling a projector, comprising:
(a) determining, by a control section, if a deviation between a target position of a lens unit stored in a storage section and a present position of the lens unit detected by a position detector is equal to or larger than a predetermined value;
(b) performing, by the control section if the deviation between the target position and the present position is determined to be equal to or larger than the predetermined value, drive of a drive motor with feedforward control to drive the lens unit until the present position of the lens unit and the target position of the lens unit are coincident with each other; and
(c) performing, by the control section, drive control of the drive motor with a predetermined unit of movement of the drive motor based on a deviation between a stop position by the feedforward control and the target position,
wherein the step (c) is performed by the number of times of movement with the predetermined unit of movement of the drive motor obtained based on the following formula:

$$N = \text{INT}(X/W + 0.5)$$

(where N denotes the number of times of movement by the predetermined unit of movement of the drive motor, X denotes the deviation between the stop position by the feedforward control and the target position, and W denotes the predetermined unit of movement of the drive motor).

6. The method of controlling a projector according to claim 5, wherein
the predetermined unit of movement of the drive motor is a smallest moving distance by which the control section can control the drive motor.

7. The method of controlling a projector according to claim 5, wherein
the step (c) is performed in a direction in which the deviation between the stop position and the target position is reduced until the deviation between the stop position and the target position becomes equal to or smaller than a half of the predetermined unit of movement of the drive motor or until a sign of the deviation between the stop position and the target position is inverted.

8. The method of controlling a projector according to claim 5, wherein
the drive motor performs shift drive of the lens unit.

* * * * *